US010729994B2

(12) United States Patent
Svensson et al.

(10) Patent No.: US 10,729,994 B2
(45) Date of Patent: *Aug. 4, 2020

(54) ROTARY DISC FILTER

(71) Applicant: Veolia Water Solutions & Technologies Support, Saint-Maurice (FR)

(72) Inventors: Emil Svensson, Trelleborg (SE); Kjell-Ake Svensson, Limhamn (SE); Per Larsson, Trelleborg (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 986 days.

This patent is subject to a terminal disclaimer.

(21) Appl. No.: 14/958,001

(22) Filed: Dec. 3, 2015

(65) Prior Publication Data

US 2017/0157540 A1 Jun. 8, 2017

(51) Int. Cl.
| | | |
|---|---|---|
| *B01D 33/50* | (2006.01) | |
| *B01D 35/147* | (2006.01) | |
| *B01D 33/21* | (2006.01) | |
| *B01D 33/15* | (2006.01) | |
| *B01D 33/42* | (2006.01) | |
| *C02F 1/00* | (2006.01) | |

(52) U.S. Cl.
CPC ............ *B01D 33/50* (2013.01); *B01D 33/15* (2013.01); *B01D 33/21* (2013.01); *B01D 33/42* (2013.01); *B01D 35/147* (2013.01); *C02F 1/001* (2013.01); *B01D 2201/084* (2013.01); *B01D 2201/325* (2013.01); *B01D 2201/36* (2013.01); *B01D 2201/48* (2013.01); *C02F 2301/043* (2013.01); *C02F 2303/16* (2013.01)

(58) Field of Classification Search
None
See application file for complete search history.

(56) References Cited

U.S. PATENT DOCUMENTS

| | | | | | |
|---|---|---|---|---|---|
| 5,641,402 | A | * | 6/1997 | Kohonen | B01D 33/21 210/330 |
| 5,759,397 | A | * | 6/1998 | Larsson | B01D 33/073 210/331 |
| 5,849,202 | A | * | 12/1998 | Koch | B01D 33/722 210/780 |
| 5,900,158 | A | * | 5/1999 | Ruokolainen | B01D 33/21 210/772 |
| 5,914,048 | A | * | 6/1999 | Chase | B01D 33/21 137/487.5 |

(Continued)

FOREIGN PATENT DOCUMENTS

WO  2014159327 A1  10/2014

*Primary Examiner* — Robert J Popovics
(74) *Attorney, Agent, or Firm* — Coats & Bennett PLLC

(57) ABSTRACT

A disc filter includes a filtrate holding tank disposed below a series of disc-shaped filter members supported on a drum. Filtrate from the holding tank is used to backwash filter media on the disc-shaped filter members. Filtrate is discharged from the holding tank via a filtrate conduit. Bypass water is directed through a bypass conduit in the disc filter and mixed with the filtrate downstream of the filtrate holding tank. This assures that the filtrate used to backwash the filter media does not include bypass water.

22 Claims, 6 Drawing Sheets

(56) References Cited

U.S. PATENT DOCUMENTS

| | | | | |
|---|---|---|---|---|
| 5,951,878 A * | 9/1999 | Astrom | B01D 33/21 | 210/197 |
| 6,063,294 A * | 5/2000 | Martensson | B01D 33/21 | 210/103 |
| 6,096,198 A * | 8/2000 | Underhill | B01D 17/0202 | 210/123 |
| 6,103,132 A * | 8/2000 | Seyfried | B01D 33/073 | 210/791 |
| 6,110,386 A * | 8/2000 | Underhill | B01D 17/0202 | 210/167.02 |
| 6,217,782 B1 * | 4/2001 | Tuori | B01D 29/114 | 210/785 |
| 6,258,282 B1 * | 7/2001 | Strid | B01D 33/21 | 210/780 |
| 6,283,306 B1 * | 9/2001 | Nilsson | B01D 33/21 | 210/391 |
| 6,284,136 B1 * | 9/2001 | Tuori | B01D 29/114 | 210/331 |
| 6,294,098 B1 * | 9/2001 | Bergmann | B01D 33/503 | 210/791 |
| 6,596,166 B1 * | 7/2003 | Danielsson | B01D 33/463 | 210/324 |
| 6,833,077 B2 * | 12/2004 | Flanagan | B01D 33/804 | 210/772 |
| 7,005,067 B2 * | 2/2006 | Flanagan | B01D 33/21 | 210/248 |
| 7,597,805 B2 * | 10/2009 | Danielsson | B01D 33/21 | 210/232 |
| 7,972,508 B2 * | 7/2011 | Danielsson | B01D 33/21 | 210/232 |
| 8,002,994 B2 * | 8/2011 | Engdahl | B01D 33/21 | 210/768 |
| 8,101,090 B2 * | 1/2012 | Ralvert | B01D 33/21 | 210/797 |
| 8,409,436 B2 * | 4/2013 | Danielsson | B01D 33/21 | 210/232 |
| 8,444,862 B2 * | 5/2013 | Ralvert | B01D 33/21 | 210/780 |
| 8,518,273 B2 * | 8/2013 | Lownertz | D21C 11/0064 | 162/30.11 |
| 8,864,991 B2 * | 10/2014 | Larsson | B01D 33/23 | 210/331 |
| 8,926,843 B2 * | 1/2015 | Baker | B01D 33/11 | 210/107 |
| 8,961,785 B2 * | 2/2015 | Danielsson | B01D 33/21 | 210/232 |
| 9,061,226 B2 * | 6/2015 | Love | B01D 33/073 | |
| 10,188,971 B2 * | 1/2019 | Danielsson | B01D 33/21 | |
| 10,589,201 B2 * | 3/2020 | Larsson | B01D 33/13 | |
| 2006/0260999 A1 * | 11/2006 | Danielsson | B01D 29/58 | 210/402 |
| 2008/0035584 A1 * | 2/2008 | Petit | B01D 33/50 | 210/780 |
| 2009/0020483 A1 * | 1/2009 | Davis | B01D 33/50 | 210/784 |
| 2009/0020484 A1 * | 1/2009 | Davis | B01D 33/70 | 210/784 |
| 2010/0012570 A1 * | 1/2010 | Danielsson | B01D 33/215 | 210/235 |
| 2010/0032388 A1 * | 2/2010 | Ralvert | B01D 33/21 | 210/797 |
| 2010/0126945 A1 * | 5/2010 | Patel | C12P 19/04 | 210/757 |
| 2012/0000842 A1 * | 1/2012 | Danielsson | B01D 29/58 | 210/236 |
| 2012/0091065 A1 * | 4/2012 | Xia | B01D 29/39 | 210/702 |
| 2012/0103890 A1 * | 5/2012 | Larsson | B01D 33/23 | 210/236 |
| 2012/0111805 A1 * | 5/2012 | Ralvert | B01D 33/21 | 210/797 |
| 2012/0325753 A1 * | 12/2012 | Baker | B01D 33/11 | 210/744 |
| 2013/0105382 A1 * | 5/2013 | Strid | B01D 33/21 | 210/391 |
| 2013/0153486 A1 * | 6/2013 | Danielsson | B01D 33/21 | 210/330 |
| 2014/0048474 A1 * | 2/2014 | Kuk | B01D 33/21 | 210/393 |
| 2014/0069876 A1 * | 3/2014 | Grace | B01D 33/76 | 210/780 |
| 2014/0124461 A1 * | 5/2014 | Buisson | B01D 33/804 | 210/780 |
| 2014/0346104 A1 * | 11/2014 | Ekberg | B01D 29/012 | 210/323.1 |
| 2014/0360950 A1 * | 12/2014 | Davis | B01D 33/50 | 210/784 |
| 2015/0190740 A1 * | 7/2015 | Danielsson | B01D 33/23 | 210/236 |
| 2015/0246302 A1 * | 9/2015 | Petit | B01D 33/0093 | 210/780 |
| 2015/0290564 A1 * | 10/2015 | Hoefken | B01D 33/23 | 210/331 |
| 2015/0290565 A1 * | 10/2015 | Hoefken | B01D 33/23 | 210/331 |
| 2015/0290566 A1 * | 10/2015 | Luukkanen | B01D 33/21 | 210/797 |
| 2016/0045871 A1 * | 2/2016 | Liebermann | B01D 33/21 | 210/321.68 |
| 2016/0074784 A1 * | 3/2016 | Illi | B01D 33/21 | 210/739 |
| 2016/0121244 A1 * | 5/2016 | Ylisiurua | B01D 33/803 | 210/232 |
| 2016/0129377 A1 * | 5/2016 | Stewart | B01D 33/48 | 210/107 |
| 2017/0157540 A1 * | 6/2017 | Svensson | C02F 1/001 | |
| 2018/0178147 A1 * | 6/2018 | Thysell | B01D 33/21 | |
| 2019/0255468 A1 * | 8/2019 | Larsson | B01D 33/11 | |
| 2019/0314743 A1 * | 10/2019 | Jibert | B01D 33/503 | |

* cited by examiner

ROTARY DISC FILTER

FIELD OF THE INVENTION

The present invention relates to rotary disc filters for removing suspended solids from water.

BACKGROUND OF THE INVENTION

Rotary disc filters are used to remove suspended solids from water. Influent water flows into a drum and from the drum into a series of disc-shaped filter members secured around the drum. From the disc-shaped filter members, the water flows outwardly through filter media disposed on opposite sides of the disc-shaped filter members. Suspended solids in the water are captured on the interior surfaces of the filter media. From time-to-time, the suspended solids are removed from the interior surfaces of the filter media. This is achieved by rotating the filter media to an upper cleaning position and backwashing the filter media. A pressurized backwash is sprayed onto the exterior surfaces of the filter media, discharging the suspended solids into a trough disposed in the drum. The suspended solids are then discharged from the trough and the disc filter.

To control head pressure in the disc filter, some of the influent water may be diverted from the drum and the disc-shaped filter members. This diverted water is referred to as bypass water. In most cases, the bypass water is directly discharged from the disc filter separately from the disc filter outlet. That is, the bypass water is separately discharged from the disc filter without combining the bypass water with the filtrate in the disc filter itself. This is often a costly solution that is disfavored by end users. In order to implement this solution, one must provide a separate pipe or another concrete channel outside of the disc filter in order to channel the bypass downstream of the disc filter where the bypass water can be mixed with the disc filter effluent or filtered water. A more economical solution is to mix the bypass water with the filtered water in the disc filter, thus bypassing the filtration step itself. However, this presents a backwash problem. Filtered water in the disc filter is typically used for the backwash. Now by mixing the bypass water with the filtered water, there are suspended solids in the filtered water attributable to the bypass water and the suspended solids tend to clog the backwash nozzles and any upstream strainers that are employed to protect the nozzles.

Therefore, there has been and continues to be a need for a rotary disc filter that, in a practical and cost effective way, handles bypass water without suspended solids from the bypass water interfering with the backwash system of the disc filter.

SUMMARY OF THE INVENTION

The disc filter disclosed herein includes a system for handling bypass water such that the bypass water is mixed with filtered water within the confines of the disc filter in a manner that assures that the filtered water used as a backwash does not include the bypass water. In one exemplary design, filtered water or filtrate is held in a filtered water chamber or tank underlying the disc-shaped filter members. Filtered water used as a backwash is sourced from this chamber or tank. The disc filter further includes a filtered water conduit communicatively connected to the filtered water chamber or tank. Filtered water flows from the chamber or tank through this conduit and is discharged from the disc filter. Bypass water overflowing from an influent water holding tank is directed into a bypass conduit that extends through a portion of the disc filter. The bypass conduit leads to and is communicatively connected with the filtered water conduit. Bypass water flows through the bypass conduit and is mixed with the filtered water. The mixture of filtered water and bypass water is then discharged from the disc filter. This assures that the filtered water used as a backwash does not include the unfiltered bypass water.

In one embodiment of the present invention, a rotary disc filter is provided with an inlet for directing water into the drum of the disc filter and a filtered water outlet for discharging filtered water from the disc filter wherein both the inlet and the filtered water outlet are disposed on an inlet end portion of the disc filter.

Other objects and advantages of the present invention will become apparent and obvious from a study of the following description and the accompanying drawings which are merely illustrative of such invention.

DESCRIPTION OF EXEMPLARY EMBODIMENTS

With further reference to the drawings, shown therein is a rotary disc filter indicated generally by the numeral 10. As discussed below, disc filter 10 includes a unique design for handling bypass water and mixing the bypass water with filtered water (sometimes referred to as filtrate) in the disc filter without adversely impacting the backwashing system or process of the disc filter. Before discussing design features relating to handling the bypass water, and the arrangement for mixing bypass water with filtered water, it will be beneficial to briefly discuss the basic design of rotary disc filters.

Figure 1:
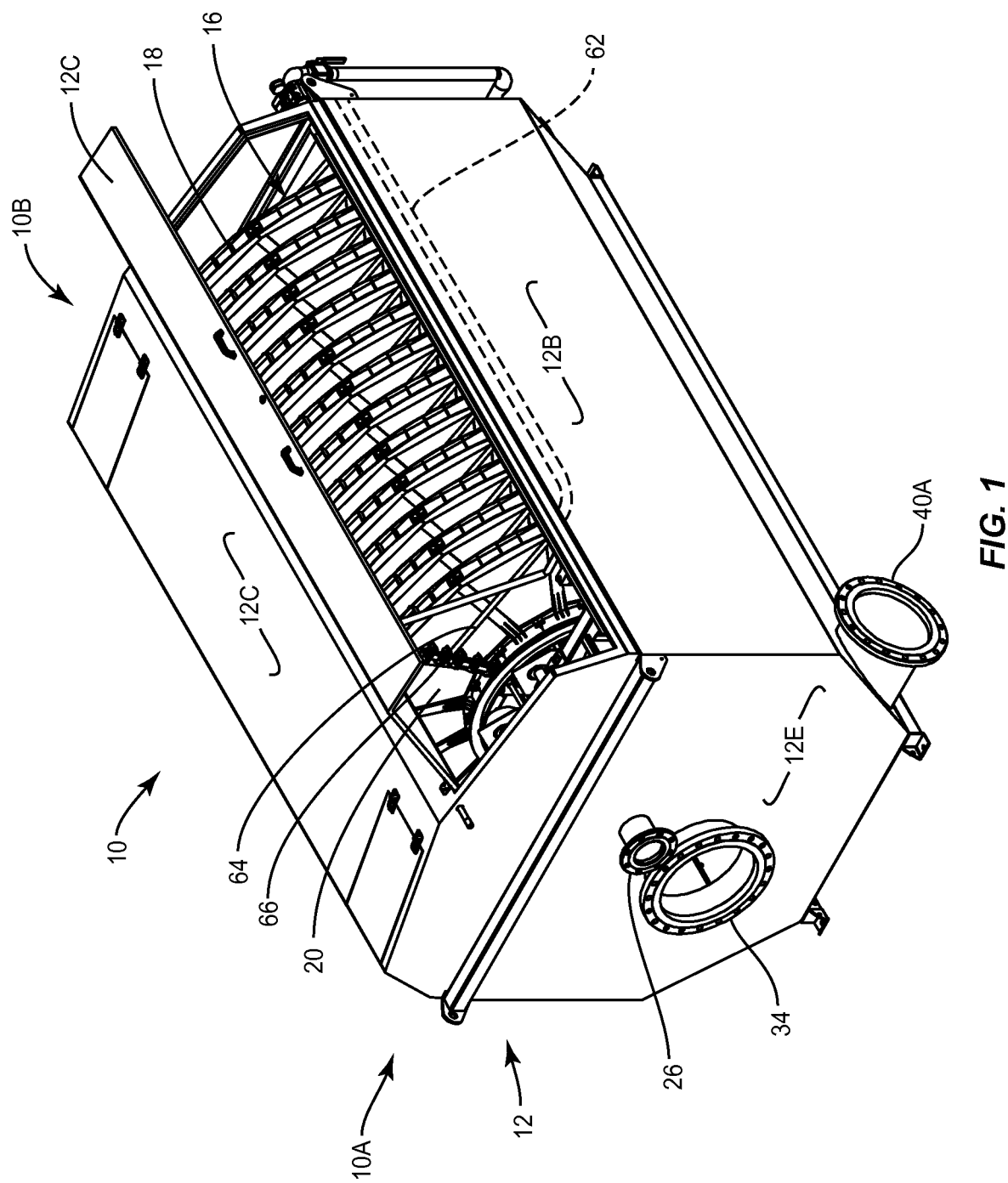
FIG. 1 is a perspective view of the disc filter.
Figure 3:
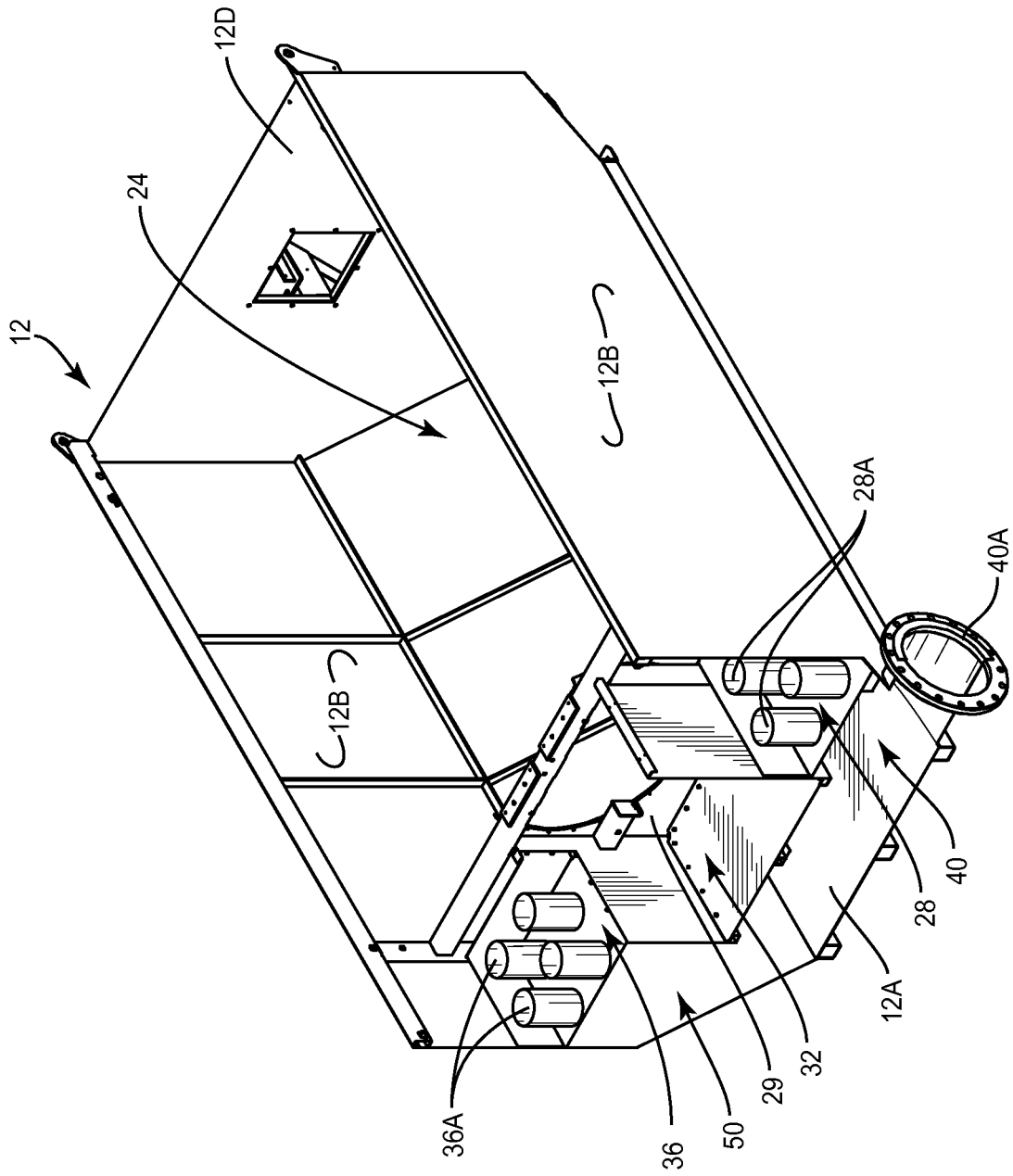
FIG. 3 is a perspective view showing the housing of the disc filter without the inlet wall and without depicting other components of the disc filter.
Figure 4:
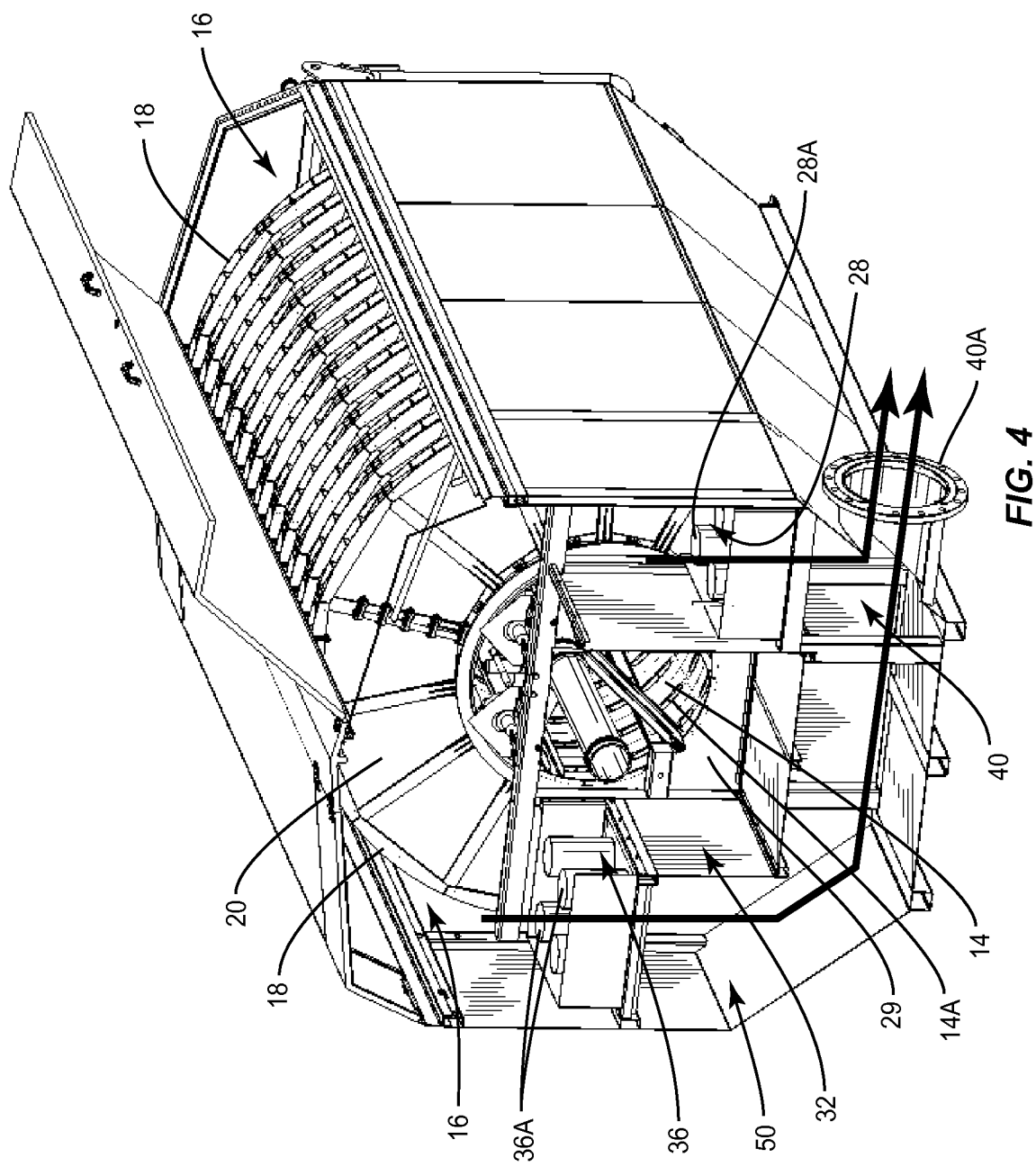
FIG. 4 is a perspective view of one embodiment of the disc filter with the inlet wall removed to better illustrate structure behind the inlet wall.

With particular reference to the drawings, the disc filter includes an outer housing 12. See FIGS. 1 and 3. Outer housing 12 includes a bottom 12A, side walls 12B, a pair of openable top panels 12C, a back wall 12D and a front or inlet wall 12E. Housing 12 can be constructed of various suitable material. In one embodiment, the housing 12 is a metal structure. Disposed inside the housing 12 is a frame structure for supporting various components that make up the disc filter 10. In this regard, a drum 14 is rotatively mounted on the frame structure within the housing 12. See FIGS. 4 and 5. Generally, the drum is closed except that it includes an inlet opening and a series of openings 14A formed in the surface thereof for enabling influent water to flow from the drum into a series of disc-shaped filter members (sometimes referred to as filter discs), indicated generally by the numeral 16, mounted on the drum. That is, as will be appreciated from subsequent discussions herein, influent water is directed into the drum 14 and from the drum through openings 14A into the respective disc-shaped filter members 16.

The number of filter discs 16 secured on the drum can vary. Each filter disc 16 includes a filter frame 18 and filter media 20 secured on opposite sides thereof. A holding area is defined inside each filter disc 16 for receiving and holding water to be filtered by the disc filter 10. Head pressure associated with the influent water is effective to cause the water to flow outwardly from the filter discs 16 and through the filter media 20. Water exiting the filter discs 16 is filtered water or filtrate. This results in suspended solids in the water being captured on the interior surfaces of the filter media 20. As described subsequently herein, a backwashing system is employed to dislodge the suspended solids from the filter media 20 and the suspended solids fall into a trough disposed in the drum 14 after which the suspended solids and some backwash are discharged from the disc filter 10 via a sludge outlet 26. See FIG. 1.

Filtered water exiting the filter disc 16 is collected in a filtered water holding chamber 24 underlying the filter disc. In the embodiment illustrated, the filtered water holding chamber 24 is formed by the housing 12 and particularly a portion of the side walls 12B and the back wall 12D. The filtered water holding chamber 24 also includes a front wall 29 disposed generally in the inlet end portion of the disc filter 10. An opening 28A is provided in the front wall 29 that enables filtered water to be discharged from the holding chamber 24. As discussed below, the backwash used to clean the filter media 20 is sourced from the filtered water in the holding chamber 24. See FIGS. 3 and 4.

Figure 2:
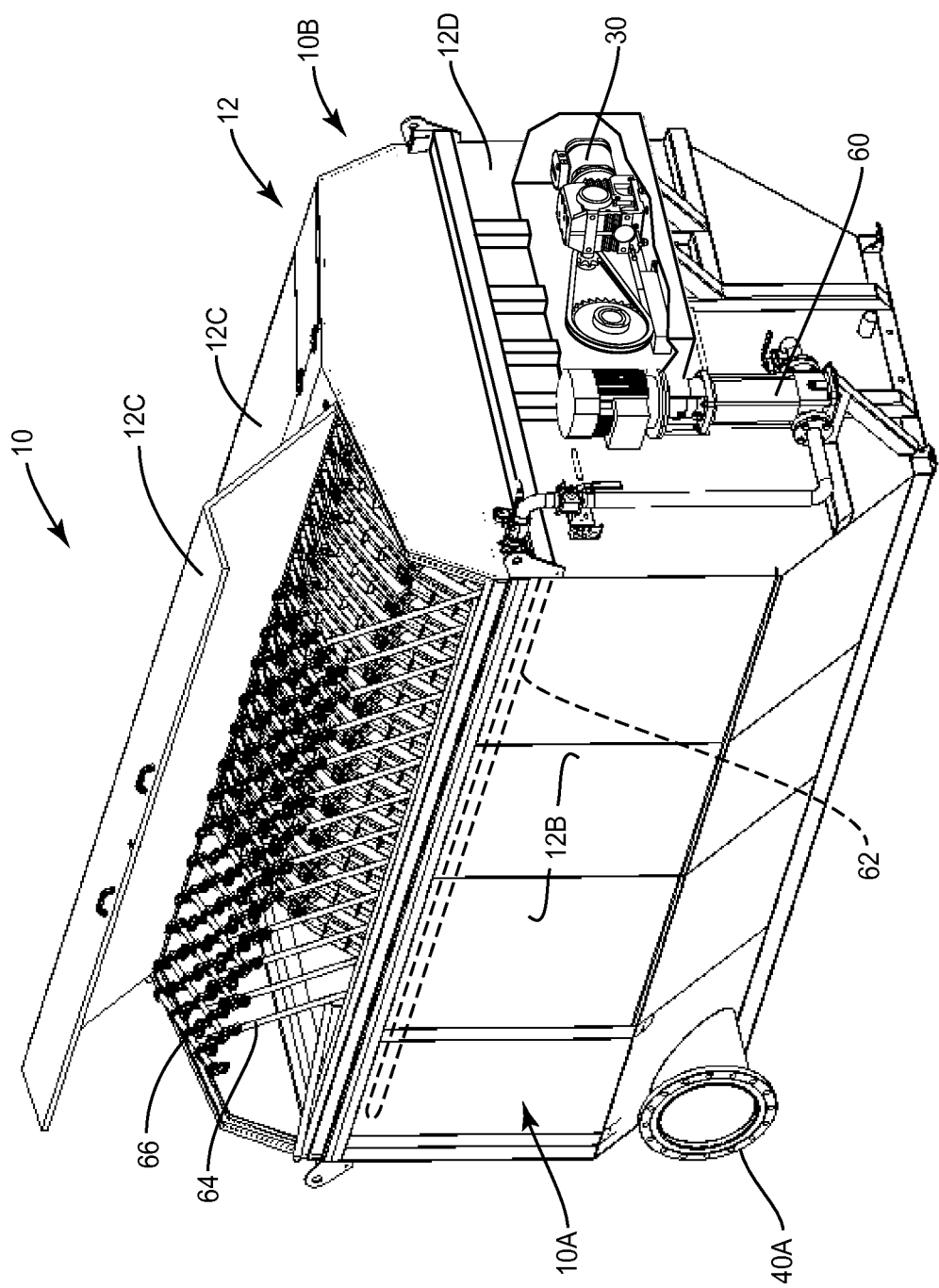
FIG. 2 is another perspective view of the disc filter viewed from the back and to one side.

Disc filter 10 is provided with a drive system for rotatively driving the drum 14 and the filter discs 16 mounted thereon. Mounted adjacent the back wall 12D is a drum motor 30 that is operative to drive a sprocket or sheave that is connected to a shaft on which the drum 14 is mounted. See FIG. 2. Various means can be operatively interconnected between the drum motor 30 and the sprocket or sheave for rotating the drum. In one example, a chain drive is utilized to drive a sprocket secured to the shaft that rotates the drum 14. Various other types of drive systems can be utilized to rotate the drum and the filter discs 16.

Disc filter 10 is provided with an inlet for directing influent water into the disc filter. As discussed below, the inlet of the disc filter 10 enables influent water to be directed into the drum 14 and from the drum 14 into the filter discs 16. Forming a part of the inlet is a water holding tank 32. Water holding tank 32 is formed or disposed between the front wall 12E and the drum 14. An inlet opening 34 is provided in the front wall 12E that leads to the water holding tank 32. Water holding tank 32 in turn includes an outlet opening that faces the inlet to the drum 14. See FIG. 3. Although not shown, there is a sealed relationship between the water holding tank 32 and the drum 14 to assure that there is no leakage of water at the interface between the water holding tank 32 and the drum 14. To control the height of the water in the drum 14, there is provided an overflow opening 36 in the water holding tank 32. See FIGS. 3 and 4. This enables excess water to overflow the water holding tank 32 and to bypass filtration by the filter discs 16. This overflow is referred to as bypass water and will be discussed subsequently herein. In any event, overflowing bypass water in this exemplary design enters a series of pipes 36A disposed adjacent the water holding tank 32. See FIGS. 3 and 4. The pipes 36A are one example among various means for achieving the same result. The bypass water flows downwardly through the pipes 36A into a bypass conduit 50 to be discussed subsequently herein.

Disc filter 10 is provided with a backwashing system for backwashing the filter media 20. Details of the backwashing system will not be dealt with herein because backwashing systems are well known and appreciated by those skilled in the art. The exemplary backwashing system shown in FIGS. 1 and 2 includes a backwash pump 60 mounted on the back wall 12D of the housing 12. Backwashing pump 60 is operative to pump filtrate from the holding chamber 24 to a manifold 62 that extends along one side of the disc filter 10. A series of feed tubes 64 branch off from the manifold 62 and extend inwardly to where the outer terminal end portions of the feed tubes 64 include nozzles 66. In a backwashing mode, the nozzles 66 are disposed adjacent opposite sides of the filter discs 16 and in conventional fashion are operative to spray a pressurized backwash onto the exterior surfaces of the filter media 20. The pressurized backwash causes suspended solids captured on the interior surfaces of the filter media to fall into a trough that is disposed within the drum 10. These suspended solids are discharged as sludge via the sludge outlet 26 that extends from the inlet end of the disc filter 10.

For reference purposes, disc filter 10 includes opposed end portions, 10A and 10B. 10A refers to the inlet end portion of the disc filter 10. 10B generally indicates a back end portion of the disc filter 10. Note that the inlet to the disc filter including the water holding tank 32 is disposed on the inlet end portion 10A. Adjacent the water holding tank 32 is a filtered water conduit 40 for directing filtered water from the filtered water holding chamber 24 out the disc filter 10. In particular, the filtered water outlet 40 is communicatively connected to the opening 28A in the front wall 29 of the filtered water holding chamber 24. See FIG. 4. This enables filtered water or filtrate in the holding chamber 24 to be discharged via the filtered water conduit 40. In the design shown in FIGS. 1-4, filter water conduit 40 extends down and turns towards an outlet opening 40A. Thus, filtered water flows from the holding chamber 24 through the opening 28A into the filtered water conduit 40 and out the disc filter via the outlet opening 40A. Provisions may be provided for directing the flow of filtered water from the holding chamber 24 to the filtered water conduit 40. For example, a series of pipes 28 may be provided adjacent opening 28A for directing filtered water from the holding chamber 24 into the filtered water conduit 40.

Figure 6:
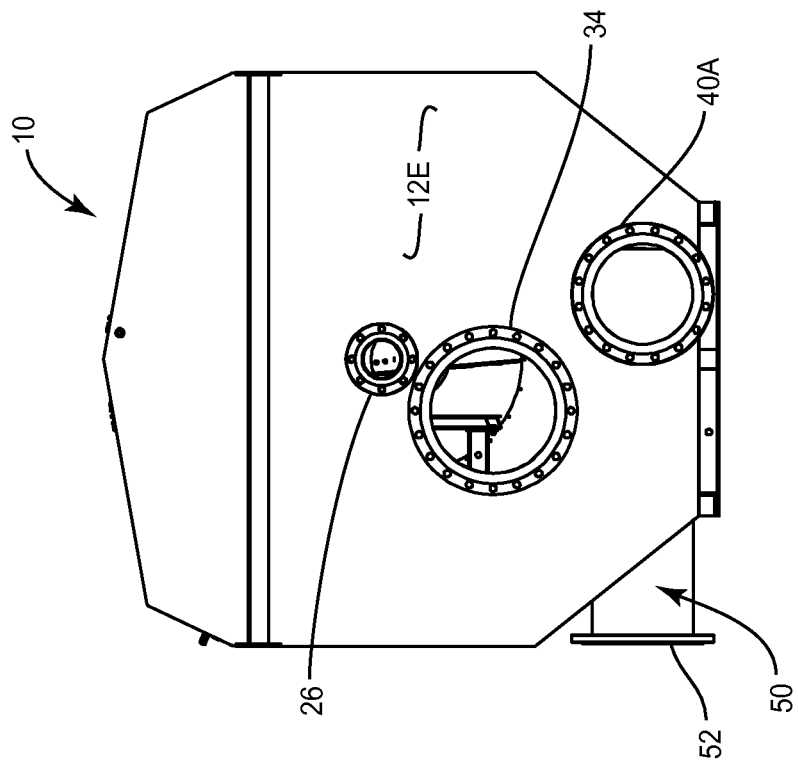
FIG. 6 is a front or inlet elevational view of another embodiment of the disc filter.

As discussed above, in some cases there is an overflow from the water holding tank 32 that yields unfiltered or bypass water. Disc filter 10 is provided with the bypass conduit 50 for handling the bypass water. As viewed in FIGS. 1 and 4, bypass conduit 50 is disposed adjacent the interior side of the front wall 12E. A portion of the bypass conduit 50 extends downwardly adjacent the left side of the water holding tank 32 or viewed in FIG. 4. In one embodiment, the bypass conduit 50 turns and extends underneath the water holding tank 32. In this embodiment, the bypass conduit 50 continues and eventually joins the filtered water conduit 40. Thus, it is appreciated that the bypass water flows downwardly through the bypass conduit 50 into the filtered water conduit 40 where the bypass water mixes with the filtered water and the resulting mixture, in one embodiment, is discharged from the disc filter 10 via outlet opening 40A. Filtered water conduit 40 and the bypass conduit 50 function to combine or mix filtered water and bypass water in the disc filter and before the filtered water and bypass water reach areas outside of the disc filter. It is appreciated that the merger of the filtered water conduit 40 and the bypass conduit 50 could be reversed. That is, the filtered water conduit 40 could be joined with the bypass conduit 50 such that the filtered water and bypass water are mixed or combined in the bypass conduit. One of the features of the disc filter design disclosed herein is that all of the pipe connections are on one end portion of the disc filter, particularly the inlet end portion 10A of the disc filter. In the case of the embodiment shown is FIGS. 1-4, the influent inlet is on the inlet end of the disc filter and the outlet 40A for the filtrate or a mixture of the filtrate and bypass water is to one side but still on the inlet end portion of the disc filter. As shown in FIG. 6, this arrangement can be modified to where the outlet 40A for the mixture of the filtrate and bypass water is on the inlet end of the disc filter.

Figure 5:
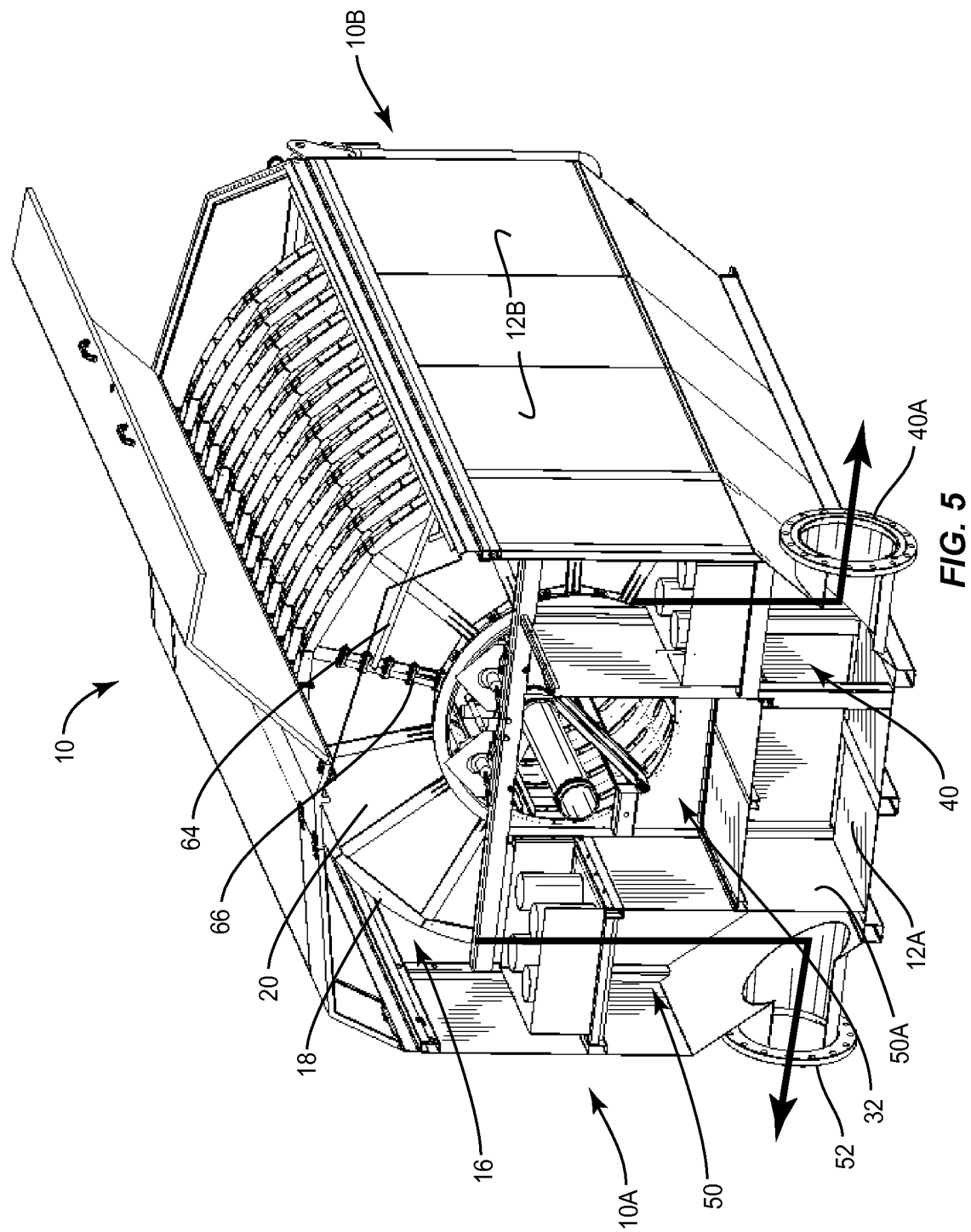
FIG. 5 is a view similar to FIG. 4 but showing a second embodiment of the present invention.
Figure 7:
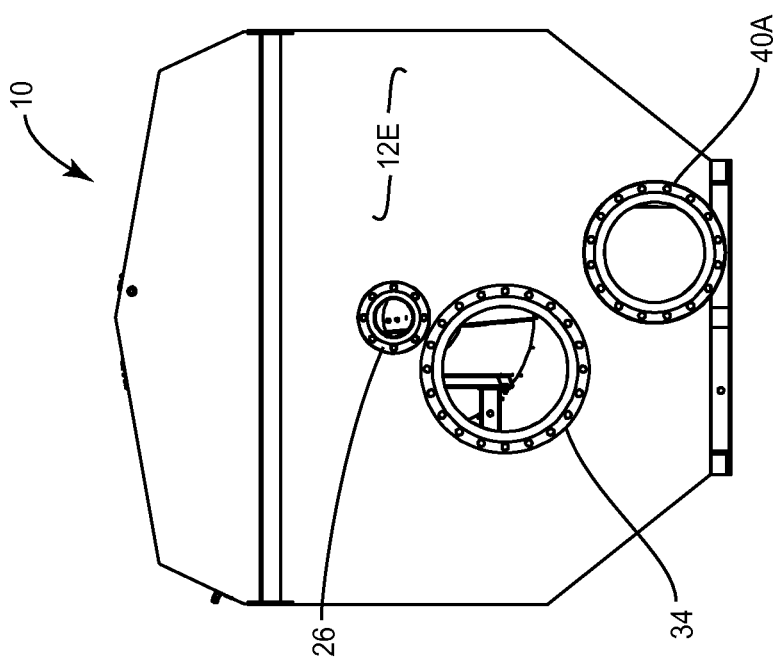
FIG. 7 is a view similar to FIG. 6 but showing still another embodiment of the disc filter.

As an option, the bypass conduit 50 may be configured to discharge the bypass water without mixing it with the filtrate. In this case, the bypass conduit 50 is modified as shown in FIG. 5. This permits the bypass water to be discharged from the disc filter 10 via an outlet opening 52. In this case, the bypass water can be mixed with the filtrate downstream of the disc filter 10 or can be collected and subjected to further treatment. As seen in FIG. 5, this modification includes closing a portion of the bypass conduit 50 with a panel 50A and adding the separate bypass outlet 52. In the embodiment illustrated in FIG. 5, the filtrate is discharged out the outlet 40A while the bypass water is discharged out the outlet 52. This arrangement can be modified also. In FIG. 7, it is shown where the filtrate outlet 40A has been moved to extend from the inlet wall 12E while the bypass water outlet 52 remains on the same side. However, in both cases, the filtrate outlet 40A and the bypass water outlet 52 are disposed on the inlet end portion 10A of the disc filter 10.

Disc filter 10 shown in the drawings is sometimes referred to as a tank version. This is because the housing 12 forms a tank that surrounds components of the disc filter, such as the drum 14 and filter disc 16 and holds filtrate. In some cases, the disc filter 10 may not include the housing or tank 12. In this case, the disc filter is referred to as a frame version. To accommodate the frame version of the disc filter, a holding area or basin is formed. In one example, a concrete basin is formed at the site of installation and the frame version of the disc filter is installed in the concrete basin. The frame version has the same basic structure, functionality, and attributes as described above with respect to the tank version. Now a portion of the concrete basin functions as the filtered water holding chamber 24. Provisions are made in the frame version of the disc filter for the filtered water conduit 40 and the bypass conduit 50. Thus, in one exemplary process with a frame version disc filter, bypass water is mixed with the filtrate at a point downstream from the filtrate holding chamber. Like the tank version described above, this assures that the backwash used for backwashing the filter media does not include the bypass water.

Some details relating to the structure of a conventional disc filter are not discussed or shown in the drawings because such is not material per se to the present invention and, furthermore, the basic structure and operation of disc filters are well known and appreciated by those ordinarily skilled in the art. Reference is made herein to U.S. Pat. No. 8,961,785 and U.S. Patent Publication 2014/0124461, the disclosures of which are expressly incorporated herein by reference. Also, it is appreciated that the term "water" as used herein encompasses all forms of feedwater including wastewater.

There are many advantages to the disc filter 10 described herein. The backwash pump 60 and the nozzles 66 are always protected against bypass water entering the backwash system. This eliminates the trouble and expense of maintenance when the disc filter is yielding bypass water. Further, there is no need for additional piping or a concrete channel for handling bypass water which is usually costly. All pipe connections are now on the same end portion of the disc filter. This results in a substantial difference in installation cost. In many cases, disc filters are added to an existing treatment plant. Having inlet and outlet connections on the same end portion of the disc filter usually means that it is much easier to fit the disc filters into existing wastewater treatment installations.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A rotary disc filter for filtering water and removing suspended solids from the water, comprising:
  a. a rotary drum for receiving water and having a plurality of openings for permitting the water to flow from the drum;
  b. an inlet for directing water into the drum;
  c. a drive for rotatively driving the rotary drum;
  d. a series of disc-shaped filter members secured around the drum for receiving water from the drum;
  e. filter media disposed on opposite sides of each disc-shaped filter member for filtering the water as the water flows from the disc-shaped filter members outwardly through the filter media to yield filtered water;
  f. a filtered water holding chamber disposed adjacent the disc-shaped filter members for receiving and holding the filtered water;
  g. a backwash system, including a pump, for pumping filtered water from the filtered water holding chamber to a series of nozzles disposed adjacent the filter media for backwashing the filter media;
  h. a filtered water conduit fluidly connected to the filtered water holding chamber and configured to receive filtered water from the filtered water holding chamber;
  i. a bypass conduit disposed on an inlet end portion of the disc filter and configured to receive bypass water that bypasses the disc-shaped filter members and configured to channel the bypass water through a portion of the disc filter; and
  j. wherein the bypass conduit is fluidly connected to the filtered water conduit and wherein the bypass conduit and the filtered water conduit are configured to-mix the bypass water and the filtered water prior to the filtered water and bypass water being discharged from the disc filter.

2. The rotary disc filter of claim 1 wherein the disc filter includes opposed end portions, the inlet end portion and a back end portion, and wherein the inlet, filtered water conduit, and bypass conduit are all disposed on the inlet end portion of the disc filter.

3. The rotary disc filter of claim 2 including an influent water holding tank that includes one or more overflow outlets fluidly connected with the bypass conduit; and wherein at least a portion of the filtered water conduit is disposed on one side of the influent water holding tank and a portion of the bypass conduit is disposed on the other side of the influent water holding tank.

4. The rotary disc filter of claim 3 wherein a portion of the bypass conduit extends beneath the influent water holding tank and connects to the filtered water conduit such that overflow from the influent water holding tank forms the bypass water and passes into the bypass conduit and flows downwardly and underneath the influent water holding tank and into the filtered water outlet where the bypass water mixes with the filtered water.

5. The rotary disc filter of claim 1 wherein the bypass conduit includes a discharge outlet opening that permits the bypass water passing through the bypass conduit to be discharged from the disc filter without being mixed with the filtered water.

6. The disc filter of claim 1 further comprising a housing that generally encompasses at least a portion of the drum and the disc-shaped filter members and includes a back wall, opposed side walls, and an inlet wall; wherein the filtered water conduit is disposed between the inlet wall and the filtered water holding chamber and wherein the bypass conduit is disposed between the inlet wall and the filtered water holding chamber.

7. The disc filter of claim 6 wherein the filtered water conduit is communicatively connected to the filtered water holding chamber through an opening in a wall in the filtered water holding chamber; and wherein the filtered water conduit extends generally downwardly from the opening in the wall of the filtered water holding chamber; and wherein the bypass conduit is configured such that bypass water entering the bypass conduit flows generally downwardly through the bypass conduit.

8. The disc filter of claim 7 wherein the bypass conduit extends generally downwardly and turns and extends across a portion of the disc filter between the inlet wall and the filtered water holding chamber.

9. A rotary disc filter for removing suspended solids from water comprising:
   a. a rotary drum for receiving the water and having a plurality of openings for permitting the water to flow from the drum;
   b. a drive for rotatively driving the rotary drum;
   c. a series of disc-shaped filter members secured around the drum for receiving water from the drum;
   d. filter media disposed on opposite sides of each disc-shaped filter member for filtering the water as the water flows from the disc-shaped filter members outwardly through the filter media to yield filtered water;
   e. a filtered water holding, chamber disposed adjacent the disc-shaped filter members for receiving and holding the filtered water;
   f. a backwash system including a pump and a series of nozzles disposed adjacent the filter media for backwashing the filter media;
   g. the disc filter including an inlet end portion and a back end portion;
   h. an inlet disposed on the inlet end portion of the disc filter for directing the water into the drum;
   i. a filtered water outlet disposed on the inlet end portion of the disc filter and fluidly connected to the filtered water holding chamber and configured to discharge filtered water from the inlet end portion of the disc filter such that the water enters the inlet end portion of the disc filter and the filtered water is discharged from the inlet end portion of the disc filter; and
   j. a bypass conduit disposed on the inlet end portion of the disc filter.

10. The disc filter of claim 9 wherein the inlet includes an influent water holding tank and the bypass conduit extends around at least a portion of the influent water holding tank.

11. The disc filter of claim 9 wherein the filtered water outlet is disposed on one side of the inlet and wherein at least a portion of the bypass conduit is disposed on the other side of the inlet.

12. The disc filter of claim 11 further including a bypass outlet opening disposed on the inlet end portion of the disc filter such that the inlet, the filtered water outlet and the bypass outlet opening are all disposed on the inlet end portion of the disc filter.

13. The disc filter of claim 9 wherein the filtered water outlet includes a filtered water conduit disposed on the inlet end portion of the disc filter and fluidly connected to the filtered water holding chamber and configured to receive filtered water from the filtered water holding chamber and discharge the filtered water from the inlet end portion of the disc filter.

14. The disc filter of claim 13 wherein the filtered water conduit extends between an inlet wall of the disc filter and the filtered water holding chamber.

15. The disc filter of claim 14 wherein the bypass conduit is sandwiched between the inlet wall and the filtered water holding chamber, and wherein the bypass conduit and the filtered water conduit join at a point between the inlet wall and the filtered water holding chamber.

16. The disc filter of claim 9 including a filtered water conduit communicatively connected between the filtered water outlet and the filtered water holding chamber; the disc filter further including a bypass conduit; and wherein both the filtered water conduit and the bypass conduit are disposed on the inlet end portion of the disc filter.

17. The disc filter of claim 16 wherein both the filtered water conduit and the bypass conduit are disposed between the filtered water holding chamber and an inlet wall of the disc filter.

18. A rotary disc filter for filtering water and removing suspended solids from the water, comprising:
   a. a rotary drum for receiving water and having a plurality of openings for permitting the water to flow from the drum;
   b. an inlet for directing water into the drum;
   c. a drive for rotatively driving the rotary drum;
   d. a series of disc-shaped filter members secured around the drum for receiving water from the drum;
   e. filter media disposed on opposite sides of each disc-shaped filter member for filtering the water as the water flows from the disc-shaped filter members outwardly through the filter media to yield filtered water;
   f. a filtered water holding chamber disposed adjacent the disc-shaped filter members for receiving and holding the filtered water;
   g. a backwash system, including a pump, for pumping filtered water from the filtered water holding chamber to a series of nozzles disposed adjacent the filter media for backwashing the filter media; and
   h. means disposed on the disc filter and exteriorly of the filtered water holding chamber for receiving filtered water from the filtered water holding chamber and for receiving bypass water that bypasses the disc-shaped filter members and mixing the bypass water with the filtered water on the disc filter to form a mixture of filtered water and bypass water and discharging the mixture from the disc filter.

19. The rotary disc filter of claim 18 wherein the disc filter includes an inlet end portion and wherein the inlet is disposed on the inlet end portion of the disc filter, and wherein said means is disposed on the inlet end portion of the disc filter.

20. The rotary disc filter of claim 18 wherein said means comprises a filtered water conduit fluidly connected to the filtered water holding chamber which receives filtered water from the filtered water holding chamber and a bypass conduit disposed on an inlet end portion of the disc filter which receives bypass water that bypasses the disc-shaped filter members and channels the bypass water through a portion of the disc filter.

21. The disc filter of claim 20 wherein the bypass conduit is fluidly connected to a filtered water conduit and wherein the bypass conduit and filtered water conduit mix the bypass water and the filtered water on the disc filter prior to the filtered water and bypass water being discharged from the disc filter.

22. The rotary disc filter of claim 20 wherein the filtered water conduit is communicatively connected to the filtered water holding chamber through an opening in a wall in the filtered water holding chamber.

\* \* \* \* \*